US012474182B2

(12) United States Patent
Rizzardini et al.

(10) Patent No.: US 12,474,182 B2
(45) Date of Patent: Nov. 18, 2025

(54) ACCELEROMETER STUCK CONDITION COMPENSATION FOR DEVICES WITH MULTIPLE ACCELEROMETERS

(71) Applicant: STMicroelectronics International N.V., Geneva (CH)

(72) Inventors: Federico Rizzardini, Settimo Milanese (IT); Lorenzo Bracco, Chivasso (IT)

(73) Assignee: STMicroelectronics International N.V., Geneva (CH)

( * ) Notice: Subject to any disclaimer, the term of this patent is extended or adjusted under 35 U.S.C. 154(b) by 265 days.

(21) Appl. No.: 18/326,880

(22) Filed: May 31, 2023

(65) Prior Publication Data

US 2024/0401978 A1 Dec. 5, 2024

(51) Int. Cl.
*G01C 25/00* (2006.01)
*G01P 15/125* (2006.01)

(52) U.S. Cl.
CPC .......... *G01C 25/005* (2013.01); *G01P 15/125* (2013.01)

(58) Field of Classification Search
None
See application file for complete search history.

(56) References Cited

U.S. PATENT DOCUMENTS 7,813,851 B2 10/2010 DeMersseman et al.
8,244,200 B2 8/2012 Orr et al.
2002/0047715 A1 4/2002 Holm
2006/0069469 A1* 3/2006 Campbell ............... G01P 15/18 701/4
2010/0064536 A1* 3/2010 Caskey ................. G06F 1/1694 33/303
2011/0161042 A1* 6/2011 Krancher .............. G06F 1/1684 702/141
2013/0144481 A1* 6/2013 Syed ...................... B60K 26/04 701/29.2
2013/0174636 A1 7/2013 Joseph
2013/0340524 A1* 12/2013 Maeda .................. G01P 15/125 73/514.02
2017/0285065 A1* 10/2017 Hawker .................. G01P 15/18

FOREIGN PATENT DOCUMENTS

DE 112012005491 T5 * 10/2014 ......... G01C 19/5776

* cited by examiner

*Primary Examiner* — Peter D Nolan
*Assistant Examiner* — Matthew Cobb
(74) *Attorney, Agent, or Firm* — Seed Intellectual Property Law Group LLP

(57) ABSTRACT

The present disclosure is directed to accelerometer measurement compensation for a device with first and second accelerometers. The first and second accelerometers are included in first and second components, respectively, of the device that are configured to rotate with respect to a hinge. The device detects a stuck condition of the first accelerometer, and compensates acceleration measurements of the first accelerometer by exploiting redundant information from the second accelerometer and applying a runtime calibration of undesired offsets.

16 Claims, 4 Drawing Sheets

ACCELEROMETER STUCK CONDITION COMPENSATION FOR DEVICES WITH MULTIPLE ACCELEROMETERS

BACKGROUND

Technical Field

The present disclosure is directed to accelerometer compensation.

Description of the Related Art

Many electronic devices have a foldable design in which a first component of a device folds on to a second component of the device. For example, many smartphones and tablets include two separate displays that rotate around a hinge in order to open and close similar to a book.

Foldable devices typically include multiple motion sensors in order to detect position of the first and second components of the device. For example, accelerometers are often used to detect movement of the first and second components of the device to determine whether the device is in an open position or a closed position, or to determine the angle between the first and second components of the device to adapt the device user interface accordingly.

BRIEF SUMMARY

The present disclosure is directed to accelerometer measurement compensation for a device with first and second accelerometers, such as a foldable mobile phone. The first and second accelerometers are included in first and second components, respectively, of the device. The first and second components include, for example, respective displays or a portion of a single display, and are configured to rotate with respect to a hinge similar to a book.

The device detects a stuck condition of the first accelerometer. In the stuck condition, a mechanical component of the first accelerometer, which is used to measure acceleration along a first axis parallel to the hinge, is stuck and unable to move. Consequently, the accelerometer incorrectly measures acceleration along the first axis. In addition, the mechanical component in the stuck condition may cause an offset in measurements along a second axis and a third axis.

Upon detecting the stuck condition, measurements by the first accelerometer are compensated by exploiting redundant information from the second accelerometer and applying a runtime calibration of undesired offsets. For example, first axis measurements of the first accelerometer are set to be equal to first axis measurements of the second accelerometer, second axis measurements of the first accelerometer are subtracted by a first constant value, and third axis measurements of the first accelerometer are subtracted by a second constant value. The first and second constant values are calibrated during the operation of the device.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing and operation of foldable electronic devices and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, a foldable device often includes accelerometers to detect movement of the first and second components of the device to determine whether the device is in an open position or a closed position. Accelerometers are generally microelectromechanical system (MEMS) sensors with one or more mechanical, movable components. For example, accelerometers often include movable electrodes configured to move along a sensing axis with respect to fixed electrodes. Acceleration along the sensing axis is determined based on capacitances between the movable electrodes and the fixed electrodes.

Unfortunately, accelerometers with mechanical components occasionally suffer from mechanical breakdowns. A mechanical component, such as the movable electrodes, occasionally becomes stuck during normal operation due to impact or bending of the mechanical component together with physical phenomena, such as the presence of particles and Van der Waals forces. While in the stuck condition, sensing along the axis in which the stuck mechanical component detects becomes unusable, as measurement along the axis becomes inaccurate.

The present disclosure is directed to a device and method for detecting a stuck condition of an accelerometer, and compensating acceleration measurements by the accelerometer for the stuck condition.

Figure 1:
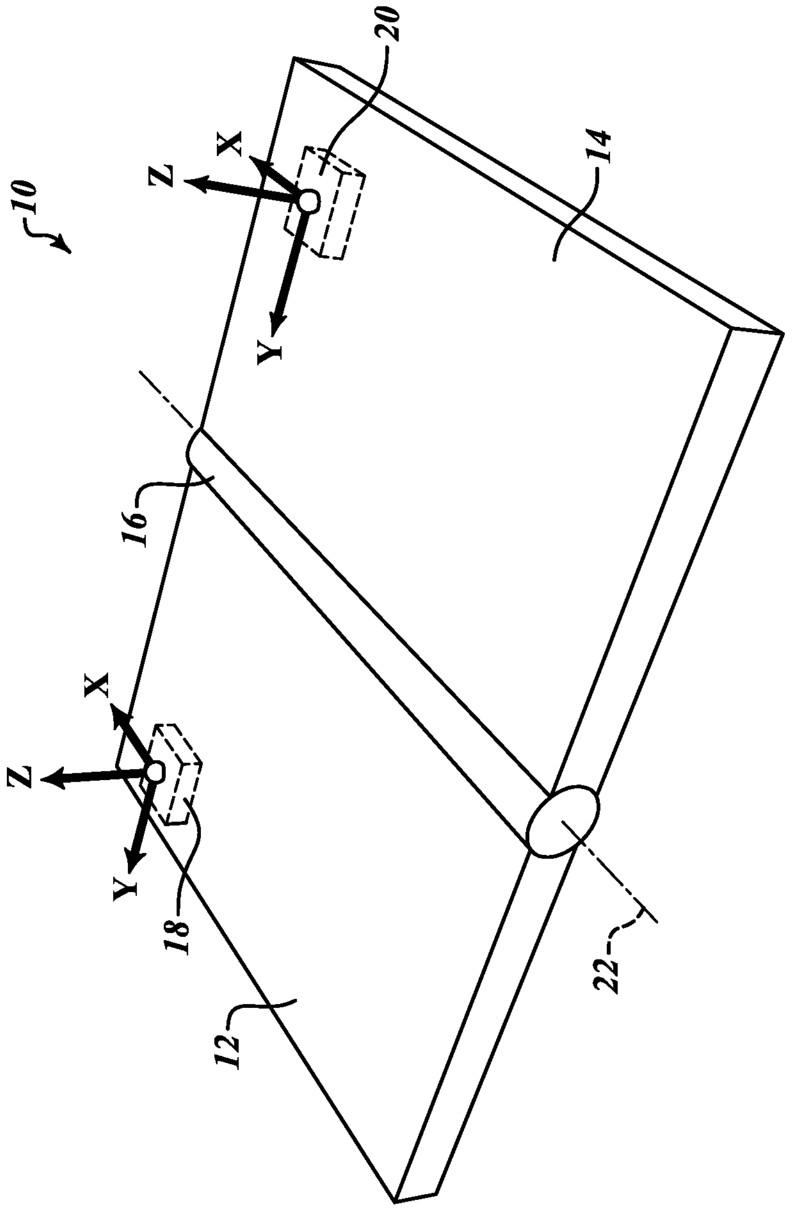
FIG. 1 is a perspective view of a device according to an embodiment disclosed herein.

FIG. 1 is a perspective view of a device 10 according to an embodiment disclosed herein.

The device 10 may be any type of electronic device with components that fold or rotate with respect to an axis. For example, the device 10 may be a mobile device, an electronic reader, a cellular phone, a laptop, or a tablet. The device includes a first component 12, a second component 14, a hinge 16, a first accelerometer 18, and a second accelerometer 20.

The first component 12 and the second component 14 are housings that include respective internal components, such as a processor, a memory, sensors (e.g., gyroscopes, proximity sensors, motions sensors, light sensors etc.), and various other electrical components, of the device 10. The first component 12 and the second component 14 house the first accelerometer 18 and the second accelerometer 20, respectively.

The first component 12 and the second component 14 may also include one or more displays and input devices. For example, each of the first component 12 and the second component 14 may include a respective display (e.g., a touch display, a light-emitting diode (LED) display, an organic light-emitting diode (OLED) display, an electronic ink display) and/or an input device (e.g., a keyboard, a track pad). As another example, the first component 12 and the second component 14 may include portions of a single bendable display that may be bent (e.g., folded or rolled) on to itself.

The first component 12 and the second component 14 are coupled to each other and configured to rotate around an axis 22, similar to a book or a laptop. For example, as shown in FIG. 1, the first component 12 and the second component 14 are configured to rotate about the hinge 16.

The first accelerometer 18 and the second accelerometer 20 are positioned in the first component 12 and the second component 14, respectively. Each of the first accelerometer 18 and the second accelerometer 20 are configured to measure accelerations of the device 10 along an x-axis, a y-axis orthogonal to the x-axis, and a z-axis orthogonal the x-axis and the y-axis, as shown in FIG. 1.

The x-axes of the first accelerometer 18 and the second accelerometer 20 extend in the same direction and parallel to the axis 22. As the first component 12 and the second component 14 rotate around the axis 22, the y-axis and the z-axis of the first accelerometer 18 may extend in different directions than the y-axis and the z-axis, respectively, of the second accelerometer 20, depending on the angle of rotation of the first component 12 and the second component 14. In a case where the device 10 is in a fully open position (e.g., upper surfaces of the first component 12 and the second component 14 face in the same direction) as shown in FIG. 1, the x-axis, the y-axis, and the z-axis of the first accelerometer 18 are parallel to the x-axis, the y-axis, and the z-axis, respectively, of the second accelerometer 20.

The first accelerometer 18 and the second accelerometer 20 are MEMS sensors with one or more mechanical, movable sensing components configured to measure acceleration along the x-axis, the y-axis, and the z-axis.

The movable sensing components of the first accelerometer 18 and the second accelerometer 20 may suffer from mechanical breakdowns. A mechanical component, such as movable electrodes, occasionally becomes stuck during normal operation due to impact or bending of the mechanical component together with physical phenomena, such as the presence of particles and Van der Waals forces. While in the stuck condition, the mechanical component inaccurately measures acceleration on the corresponding sensing axis. In addition, the mechanical component in the stuck condition may cause an offset in measurements along other axes. For example, in a case where a mechanical component configured to detect acceleration along the x-axis becomes stuck, the accelerometer detects a full-scale acceleration value (i.e., a maximum acceleration value) along the x-axis regardless of whether or not the device is moving along the x-axis. Further, offsets are induced in acceleration measurements along the y-axis and the z-axis.

Figure 2:
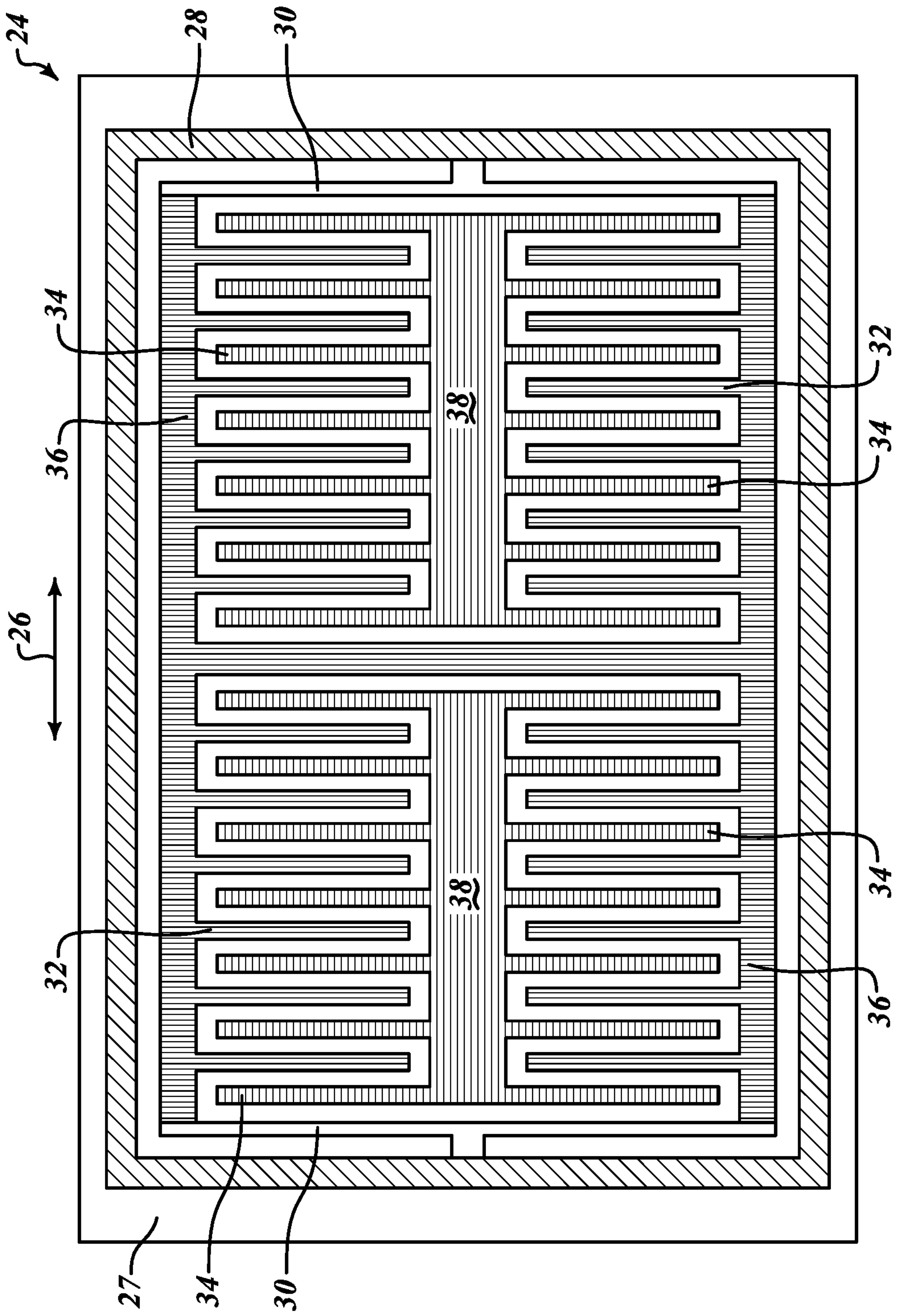
FIG. 2 is a plan view of a sensing component of an accelerometer in a resting position according to an embodiment disclosed herein.
Figure 3:
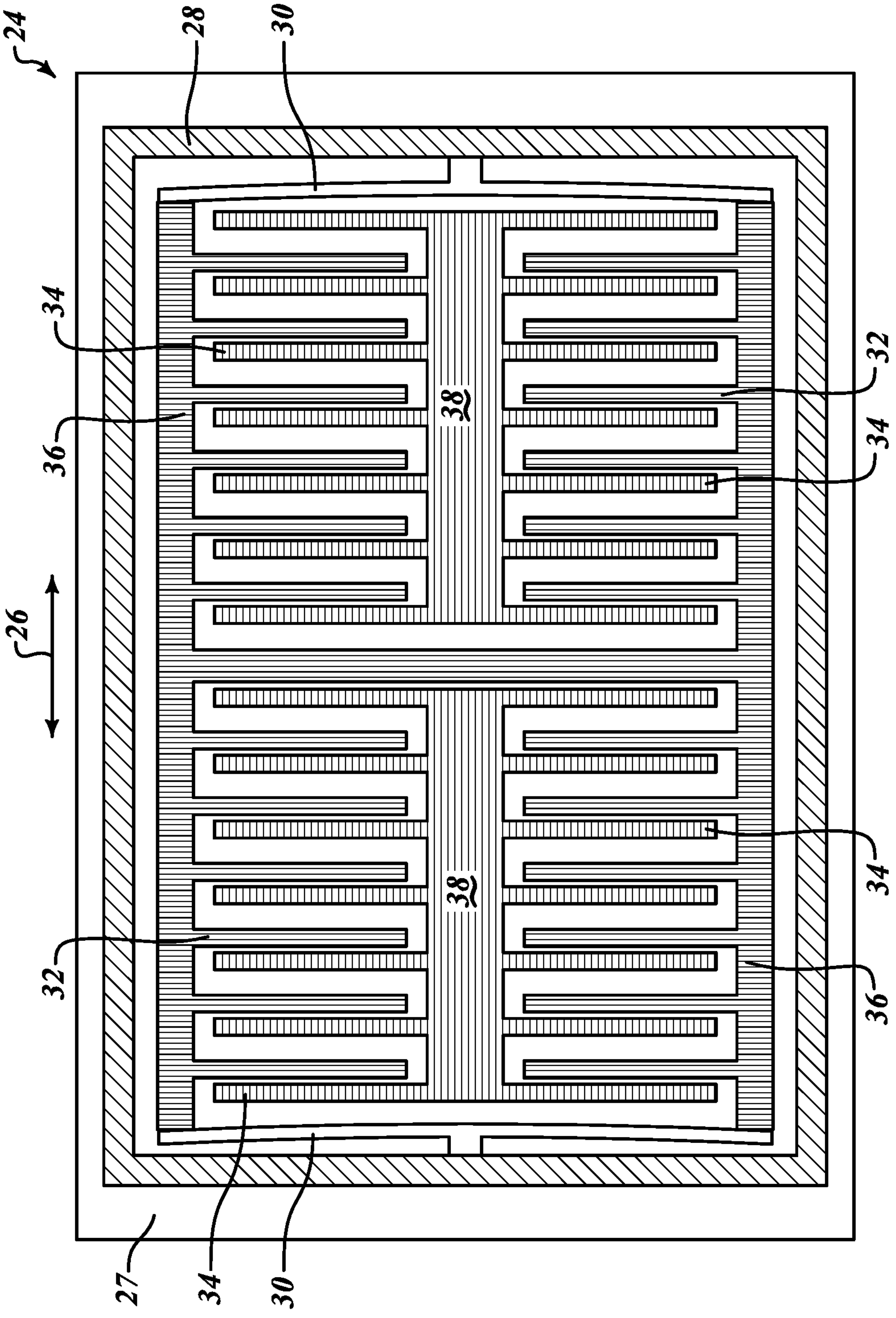
FIG. 3 is a plan view of a sensing component of an accelerometer in a flexed position according to an embodiment disclosed herein.

As an example, FIG. 2 is a plan view of a sensing component 24 of an accelerometer in a resting position according to an embodiment disclosed herein, and FIG. 3 is a plan view of the sensing component 24 in a flexed position. The sensing component 24 is configured to sense acceleration along a sensing axis 26. The sensing axis 26 may be, for example, the x-axis discussed above with respect to FIG. 1.

The sensing component 24 includes a substrate 27, a fixed support 28, elastic elements 30, movable electrodes 32, and fixed electrodes 34.

The substrate 27 provides a support for and underlies the fixed support 28, the elastic elements 30, the movable electrodes 32, and the fixed electrodes 34.

The fixed support 28 is physically coupled to the substrate 27, and does not move relative to the substrate 27.

The movable electrodes 32 are conductive electrodes that are configured to be capacitively coupled to the fixed electrodes 34. The movable electrodes 32 are arms cantilevered from support portions 36, and are electrically coupled to each other through the support portions 36. The movable electrodes are elastically coupled to the fixed support 28 by the elastic elements 30. As a result, the movable electrodes 32 are configured to move relative to the fixed support 28 and the substrate 27 along the sensing axis 26.

Similarly, the fixed electrodes 34 are conductive electrodes that are configured to be capacitively coupled to the movable electrodes 32. The fixed electrodes 34 are arms cantilevered from support portions 38, and are electrically coupled to each other through the support portions 38. In contrast to the movable electrodes 32, the fixed electrodes 34 are physically coupled to the substrate 27, and do not move relative to the substrate 27.

The sensing component 24 measures acceleration along the sensing axis 26 based on a capacitance between the movable electrodes 32 and the fixed electrodes 34.

In FIG. 2, the sensing component 24 is in a resting position in which no acceleration is applied to the sensing component 24 along the sensing axis 26. The clastic elements 30 in the resting position are at rest and unflexed. Each of the movable electrodes 32 in the resting position is positioned between two fixed electrodes 34 and approximately spaced equally from the two fixed electrodes 34.

In FIG. 3, the sensing component 24 is in a flexed position in which acceleration is applied to the sensing component 24 along the sensing axis 26. The elastic elements 30 in the flexed position are bent or arched. Each of the movable electrodes 32 in the flexed position is positioned between two fixed electrodes 34, but is positioned closer to one of the two fixed electrodes 34 (e.g., the left fixed electrode in FIG. 3).

In the event the sensing component 24 is in the stuck condition, the sensing component 24, for example, remains in the flexed position shown in FIG. 3 regardless of whether or not acceleration is applied to the sensing component 24 along the sensing axis 26. The sensing component 24 does not return to the resting position as shown in FIG. 2. As the movable electrodes 32 are positioned close to the fixed electrodes 34 in the flexed position, the sensing component 24 often measures a full-scale acceleration value (i.e., a maximum acceleration value) in the stuck condition along the sensing axis 26 regardless of whether or not acceleration is applied to the sensing component 24 along the sensing axis 26.

The stuck condition is more common in foldable devices, the printed circuit board of which is particularly stressed in terms of bending. For example, referring to FIG. 1, movable sensing components of the first accelerometer 18 and the second accelerometer 20 for sensing along the x-axis (or along the axis 22) occasionally become restricted or immovable. Fortunately, the stuck condition is often temporary, as the mechanical component often becomes unstuck due to subsequent movement and impact of the device. Regardless, however, measurements by the accelerometer during the stuck condition are unusable.

The device 10 is configured to detect a stuck condition of, for example, the first accelerometer 18 for measuring acceleration along the x-axis, and compensate acceleration measurements by the first accelerometer 18 during the stuck condition. As a result, acceleration measurements by the first accelerometer 18 remain accurate throughout the stuck condition.

Figure 4:
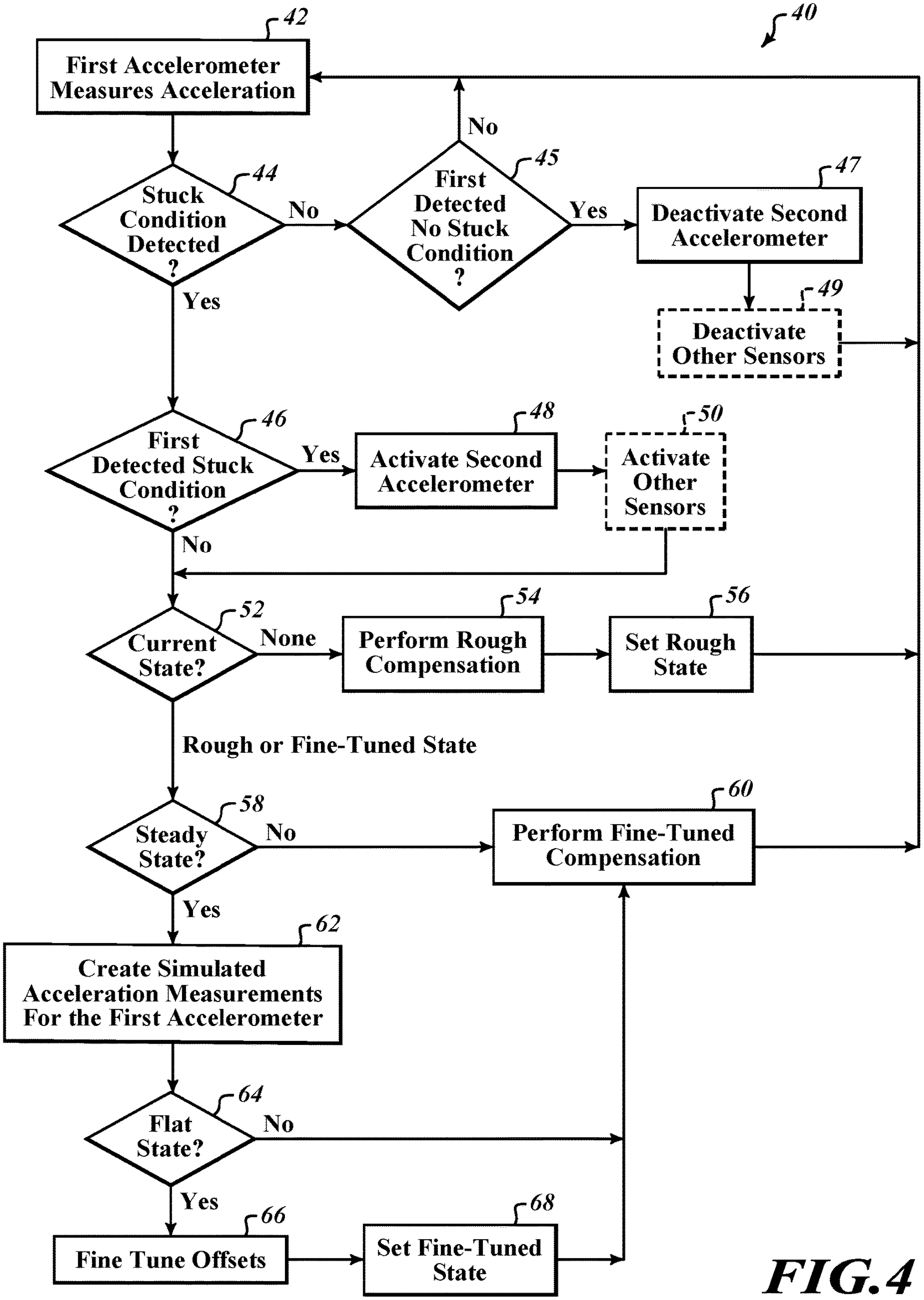
FIG. 4 is a flow diagram of a method for compensating acceleration measurements according to an embodiment disclosed herein.

FIG. 4 is a flow diagram of a method 40 for compensating acceleration measurements according to an embodiment disclosed herein. In the method 40, acceleration measurements by the first accelerometer 18 are compensated for a stuck condition. The method 40 detects and fixes the stuck condition of the first accelerometer 18 by exploiting redundant information from the second accelerometer 20 and applying a runtime calibration of undesired offsets. The same can be performed for the second accelerometer 20.

The method 40 may be performed by circuitry of the device 10, or by processors of the first accelerometer 18 or the second accelerometer 20. The method 40 may also be performed by a processor of the device 10 executing a program, which is stored in a memory coupled to the processor.

In block 42, the first accelerometer 18 measures acceleration of the device 10 along the x-axis, the y-axis, and the z-axis. Initially, in order to conserve power of the device 10, if not specifically utilized by other functionalities of the device 10, the second accelerometer 20 is in a low power (e.g., sleep) or off state, and does not measure any acceleration of the device 10.

In block 44, the device 10 determines whether the first accelerometer 18 is in a stuck condition. More specifically, the device 10 determines whether the mechanical, movable component of the first accelerometer 18 that measures acceleration along the x-axis is in the stuck condition. As discussed above, in the stuck condition, the mechanical component is unable to move due to, for example, impact or bending of the mechanical component together with physical phenomena, such as the presence of particles or Van der Waals forces. Consequently, the mechanical component inaccurately measures acceleration along the x-axis and causes offsets in measurements along the y-axis and the z-axis.

The device 10 determines whether or not an absolute value of the x-axis acceleration measurement by the first accelerometer 18 is greater than a stuck condition threshold value for a determined amount of time. In one embodiment, the stuck condition threshold value is equal to or within a determined value of a full-scale acceleration value (i.e., a maximum acceleration value) along the x-axis. The device 10 detects the stuck condition in response to determining an absolute value of the x-axis acceleration measurement by the first accelerometer 18 is greater than the stuck condition threshold value for the determined amount of time.

If the stuck condition is not detected in block 44, the first accelerometer 18 is in a no stuck or unstuck condition and the method 40 moves to block 45. If the stuck condition is detected in block 44, the method 40 moves to block 46.

In block 45, the device 10 determines whether no stuck condition detected in block 44 is a first or initial no stuck condition detected. For example, the device 10 determines whether the no stuck condition detected in block 44 is a first or initial no stuck condition detected since the previous no stuck condition. A first no stuck condition is considered as a transition from a stuck condition to a no stuck condition.

If the no stuck condition detected in block 44 is not the first no stuck condition detected, the method 40 returns to block 42, where the first accelerometer 18 continues to measure acceleration of the device 10 along the x-axis, the y-axis, and the z-axis. If the no stuck condition detected in block 44 is the first no stuck condition detected, the method 40 moves to block 47.

In block 47, the second accelerometer 20 is set to a low power (e.g., sleep) or off state, and does not measure any acceleration of the device 10. The method 40 then moves to block 49.

In block 49, other sensors besides the second accelerometer 20 are deactivated as well. For example, sensors, such as gyroscopes, proximity sensors, motions sensors, and light sensors, in each of first component 12 and the second component 14 may be set to a low power (e.g., sleep) or an off state. It is noted that block 49 may be removed in case no other sensors are set to a low power or off state. The method 40 then returns to block 42, where the first accelerometer 18 continues to measure acceleration of the device 10 along the x-axis, the y-axis, and the z-axis.

Returning to block 44, if the stuck condition is detected in block 44, the method 40 moves to block 46.

In block 46, the device 10 determines whether the stuck condition detected in block 44 is a first or initial stuck condition detected. For example, the device 10 determines whether the stuck condition detected in block 44 is a first or initial stuck condition detected since the previous stuck condition. A first stuck condition is considered as a transition from a no stuck condition to a stuck condition.

If the stuck condition detected in block 44 is the first stuck condition detected, the method 40 moves to block 48. If the stuck condition detected in block 44 is not the first stuck condition detected, the method 40 moves to block 52.

In block 48, the second accelerometer 20 is set to an on state and activated, and begins to measure acceleration of the device 10 along the x-axis, the y-axis, and the z-axis. The method 40 then moves to block 50.

In block 50, other sensors besides the second accelerometer 20 are activated as well. For example, sensors, such as gyroscopes, proximity sensors, motions sensors, and light sensors, in each of first component 12 and the second component 14 may be set to an on state. It is noted that block 50 may be removed in case no other sensors are set to a low power (e.g., sleep) or off state. The method 40 then moves to block 52.

In block 52, a current state of the compensation is detected. The current state may be set to no state, a rough state, or a fine-tuned state. The current state is set to no state in a case where neither the rough state nor the fine-tuned state is set. The current state is set to the rough state in a case where rough compensation is performed on acceleration measurements by the first accelerometer 18. The current state is set to the fine-tuned state in a case where fine-tuned compensation is performed on the acceleration measurements by the first accelerometer 18. Rough compensation and fine-tuned compensation will be discussed in further detail below.

If the current state is set to no state, the method 40 moves to block 54. If the current state is set to the rough state or the fine-tuned state, the method 40 moves to block 58.

In block 54, the device 10 performs rough compensation on the acceleration measurements by the first accelerometer 18. The rough compensation provides a first adjustment of the x-axis, the y-axis, and the z-axis acceleration measurements by the first accelerometer 18.

The rough compensation sets the following values for the first accelerometer 18:

$y$-axis rough offset=a first offset value $z$-axis rough offset=a second offset value $y$-axis offset=$y$-axis rough offset $z$-axis offset=$z$-axis rough offset compensated $x1$-axis acceleration=$x2$-axis acceleration compensated $y1$-axis acceleration=$y1$-axis acceleration−$y$-axis rough offset compensated $z1$-axis acceleration=$z1$-axis acceleration−$z$-axis rough offset The y-axis rough offset and the z-axis rough offset are offset values used during the rough compensation to compensate the y-axis acceleration measurement and the z-axis acceleration measurement, respectively, by the first accelerometer 18. The y-axis rough offset and the z-axis rough offset are set to the first offset value and the second offset value, respectively, during the rough compensation.

The first offset value and the second offset value are constant values that are determined specifically for the device 10. In one embodiment, the first offset value and the second offset value are set based on the assumption that the x-axis acceleration measurement by the first accelerometer 18 is at a full-scale value. In one embodiment, the first offset value is set to 0.5 g, and the second offset value is set to 0.0 g.

The y-axis offset and the z-axis offset are offset values used during fine-tuned compensation to compensate the y-axis acceleration measurement and the z-axis acceleration measurement, respectively, by the first accelerometer 18. The fine-tuned compensation will be discussed in further detail below. The y-axis offset and the z-axis offset are initially set to the y-axis rough offset and the z-axis rough offset during the rough compensation.

The compensated x1-axis acceleration, the compensated y1-axis acceleration, and the compensated z1-axis acceleration are the x-axis acceleration measurement, the y-axis acceleration measurement, and the z-axis acceleration measurement, respectively, by the first accelerometer 18 compensated by the rough compensation. The compensated x1-axis acceleration, the compensated y1-axis acceleration, and the compensated z1-axis acceleration may be used by the device 10 during the stuck condition for further processing, such as determining an orientation of the first component.

The compensated x1-axis acceleration is set to the x2-axis acceleration. The x2-axis acceleration is the x-axis acceleration measurement by the second accelerometer 20 in block 48.

The compensated y1-axis acceleration is set to the y1-axis acceleration minus the y-axis rough offset. The y1-axis acceleration is the y-axis acceleration measurement by the first accelerometer 18 in block 42.

The compensated z1-axis acceleration is set to the z1-axis acceleration minus the z-axis rough offset. The compensated z1-axis acceleration is the z-axis acceleration measurement by the first accelerometer 18 in block 42.

The method 40 then moves to block 56.

In block 56, the current state is set to the rough state. The method 40 then returns to block 42, where the first accelerometer 18 continues to measure acceleration of the device 10 along the x-axis, the y-axis, and the z-axis.

In block 58, the device 10 determines whether or not the device 10 is in a steady state. In the steady state, the device 10 is stationary for a determined amount of time. The steady state may be determined based on measurement values by the first accelerometer 18, the second accelerometer 20, and/or the sensors activated in block 50. For example, the device 10 detects the steady state in response to measurement values remaining stable or within a determined range for a determined amount of time.

If the steady state is not detected, the method 40 moves to block 60. If the steady state is detected, the method 40 moves to block 62.

In block 60, fine-tuned compensation is performed. The fine-tuned compensation provides a second adjustment of the x-axis, the y-axis, and the z-axis acceleration measurements by the first accelerometer 18.

The fine-tuned compensation sets the following values for the first accelerometer 18:

compensated $x1$-axis acceleration=$x2$-axis acceleration compensated $y1$-axis acceleration=$y1$-axis acceleration−$y$-axis offset compensated $z1$-axis acceleration=$z1$-axis acceleration−$z$-axis offset The compensated x1-axis acceleration, the compensated y1-axis acceleration, the compensated z1-axis acceleration, the x2-axis acceleration, the y1-axis acceleration, the y-axis offset, the z1-axis acceleration, and the z-axis offset have been discussed above.

The compensated x1-axis acceleration is set to the x2-axis acceleration.

The compensated y1-axis acceleration is set to the y1-axis acceleration minus the y-axis offset.

The compensated z1-axis acceleration is set to the z1-axis acceleration minus the z-axis offset.

The method 40 then returns to block 42, where the first accelerometer 18 continues to measure acceleration of the device 10 along the x-axis, the y-axis, and the z-axis.

In block 62, the device 10 creates simulated acceleration measurements for the first accelerometer 18. The simulated acceleration measurements are used to detect a flat state of the device 10.

The simulated acceleration measurements are set to the following values:

simulated $x1$-axis acceleration=$x2$-axis acceleration simulated $y1$-axis acceleration=$y1$-axis acceleration−$y$-axis rough offset simulated $z1$-axis acceleration=$z1$-axis acceleration−$z$-axis rough offset The simulated x1-axis acceleration, the simulated y1-axis acceleration, and the simulated z1-axis acceleration are a simulated x-axis acceleration measurement, a simulated y-axis acceleration measurement, and a simulated z-axis acceleration measurement, respectively, by the first accelerometer 18.

The simulated x1-axis acceleration is set to the x2-axis acceleration, which is discussed above.

The simulated y1-axis acceleration is set to the y1-axis acceleration minus the y-axis rough offset. The y1-axis acceleration and y-axis rough offset are discussed above.

The simulated z1-axis acceleration is set to the z1-axis acceleration minus the z-axis rough offset. The z1-axis acceleration and the z-axis rough offset are discussed above.

The method 40 then moves to block 64.

In block 64, the device 10 determines whether or not the device 10 is in a flat state. In the flat state, the device 10 is fully open such that an angle between upper surfaces of the first component 12 and the second component 14 is 180 degrees and face in the same direction. For example, the device 10 is in the flat state in FIG. 1 in which the z-axes of the first accelerometer 18 and the second accelerometer 20 face upward in the same direction.

The device 10 determines whether or not the device 10 is in the flat state based on the simulated x1-axis acceleration, the simulated y1-axis acceleration, and the simulated z1-axis acceleration of the first accelerometer 18 determined in block 62; and the x-axis acceleration measurement, the y-axis acceleration measurement, and the z-axis acceleration measurement by the second accelerometer 20. The simulated acceleration measurements of the first accelerometer 18 are used because the first accelerometer 18 is in the stuck condition. In contrast, the second accelerometer 20 is not in the stuck condition; thus, the actual acceleration measurements by the second accelerometer 20 are used.

In one embodiment, the device 10 detects the flat state in response to the simulated acceleration measurements of the first accelerometer 18 and the acceleration measurements of the second accelerometer 20 indicating the first component 12 and the second component 14, respectively, are both facing upward or downward in the same direction. Otherwise, the device 10 determines the device 10 is not in the flat state.

In one embodiment, the device 10 detects the flat state in response to the simulated acceleration measurements of the first accelerometer 18 and the acceleration measurements of the second accelerometer 20 indicating the lid angle between the first component 12 and the second component 14 is 180 degrees. Otherwise, the device 10 determines the device 10 is not in the flat state.

If the flat state is not detected, the method 40 returns to block 60 where fine-tuned compensation is performed with current values of the y-axis offset and the z-axis offset. If the flat state is detected, the method 40 moves to block 66.

In block 66, the y-axis offset and the z-axis offset are fine tuned for the flat state. The y-axis offset and the z-axis offset are set to the following values:

$$y\text{-axis offset} = y1\text{-axis acceleration} - y2\text{-axis acceleration}$$

$$z\text{-axis offset} = z1\text{-axis acceleration} - z2\text{-axis acceleration}$$

The y-axis offset, the z-axis offset, the y1-axis acceleration, and the z1-axis acceleration have been discussed above. The y2-axis acceleration is the y-axis acceleration measurement by the second accelerometer 20. The z2-axis acceleration is the z-axis acceleration measurement by the second accelerometer 20.

The method 40 then moves to block 68.

In block 68, the current state is set to the fine-tuned state. The method 40 then returns to block 60, where fine-tuned compensation is performed with the updated values of the y-axis offset and the z-axis offset.

The various embodiments disclosed herein provide accelerometer measurement compensation for a device with first and second accelerometers. The device detects a stuck condition of the first accelerometer, and compensates acceleration measurements of the first accelerometer by exploiting redundant information from the second accelerometer and applying a runtime calibration of undesired offsets.

A device may be summarized as including: a first component including a first accelerometer configured to generate a first acceleration measurement; a second component including a second accelerometer configured to generate a second acceleration measurement, the first component and the second component being coupled to each other and configured to rotate around a rotation axis; and a processor configured to: detect a stuck condition of the first accelerometer in which a sensing component of the first accelerometer is unable to move, the sensing component configured to measure acceleration along the rotation axis; and compensate, in response to the stuck condition being detected, the first acceleration measurement using the second acceleration measurement.

The processor may be configured to activate, in response to the stuck condition being detected for a first time, the second accelerometer from a low power state.

Each of the first and second acceleration measurements may include a first axis acceleration, a second axis acceleration, and a third axis acceleration; the first axis acceleration may be acceleration along an axis parallel to the rotation axis, and in the compensation of the first acceleration measurement, the first axis acceleration of the first acceleration measurement may be set to the first axis acceleration of the second acceleration measurement, the second axis acceleration of the first acceleration measurement may be offset by a first value, and the third axis acceleration of the first acceleration measurement may be offset by a second value.

Each of the first and second acceleration measurements may include a first axis acceleration, a second axis acceleration, and a third axis acceleration; the first axis acceleration may be acceleration along an axis parallel to the rotation axis, and in the compensation of the first acceleration measurement, the first axis acceleration of the first acceleration measurement may be set to the first axis acceleration of the second acceleration measurement, a first value may be set to a difference between the second axis acceleration of the first acceleration measurement and the second axis acceleration of the second acceleration measurement, the second axis acceleration of the first acceleration measurement may be offset by the first value, a second value may be set to a difference between the third axis acceleration of the first acceleration measurement and the third axis acceleration of the second acceleration measurement, and the third axis acceleration of the first acceleration measurement may be offset by the second value.

The first and second values may be set in a case where the device is in a steady state in which the device is stationary for a determined amount of time, and a flat state in which the first component and the second component face the same direction.

The processor may be configured to detect the flat state based on a simulated acceleration measurement of the first accelerometer and the second acceleration measurement.

The simulated acceleration measurement may include a first axis simulated acceleration, a second axis simulated acceleration, and a third axis simulated acceleration; the first axis simulated acceleration may be set to the first axis acceleration of the second acceleration measurement, the second axis simulated acceleration may be set to the second axis acceleration of the first acceleration measurement offset by a third value, and the third axis simulated acceleration may be set to the third axis acceleration of the first acceleration measurement offset by a fourth value.

The processor may be configured to detect the steady state based on the first acceleration measurement and the second acceleration measurement.

Each of the first and second acceleration measurements may include a first axis acceleration, a second axis acceleration, and a third axis acceleration, and in the compensation of the first acceleration measurement, the first axis acceleration of the first acceleration measurement may be set to the first axis acceleration of the second acceleration measurement.

Each of the first and second acceleration measurements may include a first axis acceleration, a second axis acceleration, and a third axis acceleration; the first axis acceleration may be acceleration along an axis parallel to the rotation axis, and the processor may detect the stuck condition in response to an absolute value of the first axis acceleration of the first acceleration measurement being greater than a determined threshold value for a determined amount of time.

A method may be summarized as including: generating, by a first accelerometer in a first component of a device, a first acceleration measurement; generating, by a second accelerometer in a second component of the device, a second acceleration measurement, the first component and the second component being coupled to each other and configured to rotate around a rotation axis; detecting, by the device, a stuck condition of the first accelerometer in which a sensing component of the first accelerometer is unable to move, the sensing component configured to measure acceleration along the rotation axis; and compensating, in response to the stuck condition being detected, the first acceleration measurement using the second acceleration measurement.

Each of the first and second acceleration measurements may include a first axis acceleration, a second axis acceleration, and a third axis acceleration; the first axis acceleration may be acceleration along an axis parallel to the rotation axis, and the compensating of the first acceleration measurement may include: setting the first axis acceleration of the first acceleration measurement to the first axis acceleration of the second acceleration measurement, offsetting the second axis acceleration of the first acceleration measurement by a first value, and offsetting the third axis acceleration of the first acceleration measurement by a second value.

Each of the first and second acceleration measurements may include a first axis acceleration, a second axis acceleration, and a third axis acceleration; the first axis acceleration may be acceleration along an axis parallel to the rotation axis, and the compensating of the first acceleration measurement may include: setting the first axis acceleration of the first acceleration measurement to the first axis acceleration of the second acceleration measurement, setting a first value to a difference between the second axis acceleration of the first acceleration measurement and the second axis acceleration of the second acceleration measurement, offsetting the second axis acceleration of the first acceleration measurement by the first value, setting a second value to a difference between the third axis acceleration of the first acceleration measurement and the third axis acceleration of the second acceleration measurement, and offsetting the third axis acceleration of the first acceleration measurement by the second value.

The first and second values may be set in a case where the device is in a steady state in which the device is stationary for a determined amount of time, and a flat state in which the first component and the second component face the same direction.

Each of the first and second acceleration measurements may include a first axis acceleration, a second axis acceleration, and a third axis acceleration, and the compensating of the first acceleration measurement may include setting the first axis acceleration of the first acceleration measurement to the first axis acceleration of the second acceleration measurement.

Each of the first and second acceleration measurements may include a first axis acceleration, a second axis acceleration, and a third axis acceleration; the first axis acceleration may be acceleration along an axis parallel to the rotation axis, and the detecting of the stuck condition may be in response to detecting an absolute value of the first axis acceleration of the first acceleration measurement is greater than a determined threshold value for a determined amount of time.

A device may be summarized as including: a first component including a first accelerometer configured to measure a first acceleration along a first axis, a second acceleration along a second axis, and a third acceleration along a third axis; a second component coupled to the first component, the first component and the second component configured to rotate around an axis parallel to the first axis, the second component including a second accelerometer configured to measure a fourth acceleration along the first axis, a fifth acceleration along the second axis, and a sixth acceleration along the third axis; and a processor configured to: detect a stuck condition in a case where an absolute value of the first acceleration is greater than a determined threshold value for a determined amount of time; and compensate, in response to the stuck condition being detected, the first acceleration, the second acceleration, and the third acceleration based on the fourth acceleration, the fifth acceleration, and the sixth acceleration.

The processor may be configured to, in response to the stuck condition being detected, set the first acceleration to the fourth acceleration, offset the second acceleration by a first value, and offset the third acceleration by a second value.

The processor may be configured to: determine the device is in a steady state in which the device is stationary for a determined amount of time; determine the device is in a flat state in which the first component and the second component face the same direction; and in response to the device being determined to be in the steady state and the flat state, set the first value to a difference between the second acceleration and the fifth acceleration, and set the second value to a difference between the third acceleration and the sixth acceleration.

The processor may be configured to set the first acceleration to the fourth acceleration in response to the stuck condition being detected.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a first component including a first accelerometer configured to generate a first acceleration measurement;

a second component including a second accelerometer configured to generate a second acceleration measurement, the first component and the second component being coupled to each other and configured to rotate around a rotation axis; and a processor configured to:

detect a stuck condition of the first accelerometer in which a sensing component of the first accelerometer is unable to move, the sensing component configured to measure acceleration along the rotation axis;

compensate, in response to the stuck condition being detected, the first acceleration measurement using the second acceleration measurement; and activate, in response to the stuck condition being detected for a first time, the second accelerometer from a low power state.

2. The device of claim 1 wherein each of the first and second acceleration measurements includes a first axis acceleration, a second axis acceleration, and a third axis acceleration, the first axis acceleration is acceleration along an axis parallel to the rotation axis, and in the compensation of the first acceleration measurement, the first axis acceleration of the first acceleration measurement is set to the first axis acceleration of the second acceleration measurement, the second axis acceleration of the first acceleration measurement is offset by a first value, and the third axis acceleration of the first acceleration measurement is offset by a second value.

3. The device of claim 1 wherein each of the first and second acceleration measurements includes a first axis acceleration, a second axis acceleration, and a third axis acceleration, the first axis acceleration is acceleration along an axis parallel to the rotation axis, and in the compensation of the first acceleration measurement, the first axis acceleration of the first acceleration measurement is set to the first axis acceleration of the second acceleration measurement, a first value is set to a difference between the second axis acceleration of the first acceleration measurement and the second axis acceleration of the second acceleration measurement, the second axis acceleration of the first acceleration measurement is offset by the first value, a second value is set to a difference between the third axis acceleration of the first acceleration measurement and the third axis acceleration of the second acceleration measurement, and the third axis acceleration of the first acceleration measurement is offset by the second value.

4. The device of claim 3 wherein the first and second values are set in a case where the device is in a steady state in which the device is stationary for a determined amount of time, and a flat state in which the first component and the second component face the same direction.

5. The device of claim 4 wherein the processor is configured to detect the flat state based on a simulated acceleration measurement of the first accelerometer and the second acceleration measurement.

6. The device of claim 5 wherein the simulated acceleration measurement includes a first axis simulated acceleration, a second axis simulated acceleration, and a third axis simulated acceleration, the first axis simulated acceleration is set to the first axis acceleration of the second acceleration measurement, the second axis simulated acceleration is set to the second axis acceleration of the first acceleration measurement offset by a third value, and the third axis simulated acceleration is set to the third axis acceleration of the first acceleration measurement offset by a fourth value.

7. The device of claim 4 wherein the processor is configured to detect the steady state based on the first acceleration measurement and the second acceleration measurement.

8. The device of claim 1 wherein each of the first and second acceleration measurements includes a first axis acceleration, a second axis acceleration, and a third axis acceleration, and in the compensation of the first acceleration measurement, the first axis acceleration of the first acceleration measurement is set to the first axis acceleration of the second acceleration measurement.

9. The device of claim 1 wherein each of the first and second acceleration measurements includes a first axis acceleration, a second axis acceleration, and a third axis acceleration, the first axis acceleration is acceleration along an axis parallel to the rotation axis, and the processor detects the stuck condition in response to an absolute value of the first axis acceleration of the first acceleration measurement being greater than a determined threshold value for a determined amount of time.

10. A method, comprising:

generating, by a first accelerometer in a first component of a device, a first acceleration measurement;

generating, by a second accelerometer in a second component of the device, a second acceleration measurement, the first component and the second component being coupled to each other and configured to rotate around a rotation axis, each of the first and second acceleration measurements includes a first axis acceleration, a second axis acceleration, and a third axis acceleration, the first axis acceleration is acceleration along an axis parallel to the rotation axis;

detecting, by the device, a stuck condition of the first accelerometer in which a sensing component of the first accelerometer is unable to move, the sensing component configured to measure acceleration along the rotation axis; and compensating, in response to the stuck condition being detected, the first acceleration measurement using the second acceleration measurement, the compensating of the first acceleration measurement includes:

setting the first axis acceleration of the first acceleration measurement to the first axis acceleration of the second acceleration measurement, offsetting the second axis acceleration of the first acceleration measurement by a first value, and offsetting the third axis acceleration of the first acceleration measurement by a second value.

11. The method of claim 10 wherein the compensating of the first acceleration measurement, includes:

setting the first value to a difference between the second axis acceleration of the first acceleration measurement and the second axis acceleration of the second acceleration measurement, and setting the second value to a difference between the third axis acceleration of the first acceleration measurement and the third axis acceleration of the second acceleration measurement.

12. The method of claim 11 wherein the first and second values are set in a case where the device is in a steady state in which the device is stationary for a determined amount of time, and a flat state in which the first component and the second component face the same direction.

13. The method of claim 10 wherein the detecting of the stuck condition is in response to detecting an absolute value of the first axis acceleration of the first acceleration measurement is greater than a determined threshold value for a determined amount of time.

14. A device, comprising:

a first component including a first accelerometer configured to measure a first acceleration along a first axis, a second acceleration along a second axis, and a third acceleration along a third axis;

a second component coupled to the first component, the first component and the second component configured to rotate around an axis parallel to the first axis, the second component including a second accelerometer configured to measure a fourth acceleration along the first axis, a fifth acceleration along the second axis, and a sixth acceleration along the third axis; and a processor configured to:

detect a stuck condition in a case where an absolute value of the first acceleration is greater than a determined threshold value for a determined amount of time;

compensate, in response to the stuck condition being detected, the first acceleration, the second acceleration, and the third acceleration based on the fourth acceleration, the fifth acceleration, and the sixth acceleration; and set, in response to the stuck condition being detected, the first acceleration to the fourth acceleration, offset the second acceleration by a first value, and offset the third acceleration by a second value.

15. The device of claim 14 wherein the processor is configured to:

determine the device is in a steady state in which the device is stationary for a determined amount of time;

determine the device is in a flat state in which the first component and the second component face the same direction; and in response to the device being determined to be in the steady state and the flat state, set the first value to a difference between the second acceleration and the fifth acceleration, and set the second value to a difference between the third acceleration and the sixth acceleration.

16. The device of claim 14 wherein the processor is configured to set the first acceleration to the fourth acceleration in response to the stuck condition being detected.

* * * * *